(12) United States Patent
Xu et al.

(10) Patent No.: US 10,462,239 B1
(45) Date of Patent: Oct. 29, 2019

(54) FLEXIBLE UNITS FOR EXPERIMENTATION

(71) Applicant: Microsoft Technology Licensing, LLC, Redmond, WA (US)

(72) Inventors: Ya Xu, Los Altos, CA (US); Kylan Matthew Nieh, Fremont, CA (US); Weitao Duan, Mountain View, CA (US); Bo Liu, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

(21) Appl. No.: 15/223,865

(22) Filed: Jul. 29, 2016

(51) Int. Cl.
*G06F 15/16* (2006.01)
*H04L 29/08* (2006.01)
*H04L 12/58* (2006.01)
*G06Q 50/00* (2012.01)
*G06F 3/0482* (2013.01)
*G06Q 30/02* (2012.01)

(52) U.S. Cl.
CPC ............. *H04L 67/22* (2013.01); *H04L 51/22* (2013.01); *H04L 51/32* (2013.01); *G06F 3/0482* (2013.01); *G06Q 30/0243* (2013.01); *G06Q 50/01* (2013.01)

(58) Field of Classification Search
CPC ................................................ G06Q 30/0243
See application file for complete search history.

(56) References Cited

U.S. PATENT DOCUMENTS

| | | | | |
|---|---|---|---|---|
| 8,875,012 | B1 * | 10/2014 | Puchta | G06F 17/3089 715/234 |
| 2008/0189156 | A1 * | 8/2008 | Voda | G06Q 10/063 705/7.33 |
| 2009/0100154 | A1 * | 4/2009 | Stevenson | G06Q 30/02 709/220 |
| 2014/0180799 | A1 * | 6/2014 | Keeler | G06Q 30/0246 705/14.45 |
| 2016/0077672 | A1 * | 3/2016 | Anderson | G06F 3/0481 715/234 |
| 2016/0117717 | A1 * | 4/2016 | Moreau | G06Q 30/0243 705/14.42 |
| 2016/0211004 | A1 * | 7/2016 | Akatiff | G11B 27/002 |
| 2017/0300966 | A1 * | 10/2017 | Dereszynski | G06Q 30/0254 |
| 2017/0330114 | A1 * | 11/2017 | Ghavamzadeh | G06Q 10/067 |
| 2018/0020065 | A1 * | 1/2018 | Kucera | H04L 67/22 |

* cited by examiner

*Primary Examiner* — Hieu T Hoang
(74) *Attorney, Agent, or Firm* — Schwegman Lundberg & Woessner, P.A.

(57) ABSTRACT

A machine may be configured to perform A/B testing on customized experiment units. For example, the machine receives a specification of an experiment unit that identifies a type of subject of an experiment for execution on a social networking service (SNS), and a value of the experiment unit. The machine generates, for the value of the experiment unit, tracking data that tracks user interactions by one or more users of the SNS, via one or more browsers, with content provided during an execution of the experiment. The machine generates, for the value of the experiment unit, metric data that measures an attribute associated with the experimental unit. The machine generates an experiment report based on the tracking data and the metric data. The machine causes a presentation of the experiment report in a user interface of a client device.

12 Claims, 6 Drawing Sheets

FLEXIBLE UNITS FOR EXPERIMENTATION

TECHNICAL FIELD

The present application relates generally to systems, methods, and computer program products for performing A/B testing on customized experiment units.

BACKGROUND

It is not uncommon for companies that delivery online digital content to use experimentation in the context of data-driven decision making. A/B testing may be used to perform an experiment pertaining to delivery of content online, and to determine which variant of two variants of the experiment better accomplishes a particular goal of the experiment. Usually, in A/B testing, a group of online users is divided into a treatment group to receive the treatment variant of the experiment, and a control group to receive the control variant of the experiment. Based on the user responses received from the members of the treatment group and the control group, a conclusion regarding the goal of the experiment may be drawn.

BRIEF DESCRIPTION OF THE DRAWINGS

Some embodiments are illustrated by way of example and not limitation in the figures of the accompanying drawings, in which.

DETAILED DESCRIPTION

Example methods and systems for performing A/B testing on customized experiment units are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

Traditionally, A/B testing has been used for testing digital content delivered online. When using A/B testing, a first group of online users may be assigned to a treatment group to receive a treatment variant of an experiment, and a second group of online users may be assigned to a control group to receive a control variant of the experiment. For example, different users may be assigned to different variants and, therefore, may receive different variants of a content item (e.g., a member profile) based on a browser identifier determined using a request for the member profile received from the client device of the user.

The users may be members of a social networking service (hereinafter also "SNS"), such as LinkedIn®. The members of the SNS who are the subject of the experiment may be considered the experiment unit associated with the experiment.

The treatment variant may be different from the control variant in various ways: the digital content presented to the different groups of users may be different, the context in which the digital content is presented may be different, etc. The response of the users in the treatment and control groups may be measured. Based on the user responses received from the members of the treatment group and the control group, a conclusion regarding the goal of the experiment may be drawn.

As the number of consumers of online digital content continues to grow and as more online digital content is created, it may be beneficial to online digital content creators to implement experimentation based on customized experiment units. In some example embodiments, an experiment system associated with the SNS, in addition to performing A/B tests on the traditional experiment unit of the member of the SNS, may perform tests on customized experiment units (hereinafter also "flexible experiment units," or "experiment units"). Examples of such customized experiment units are "guest of the SNS," "company page," "email message," "job page," etc. The experiment system may generate reports pertaining to various customized experiment units automatically or on-demand.

According to various example embodiments, an experiment system receives a specification of an experiment unit that identifies a type of subject of an experiment for execution on the SNS. The experiment system also receives a value of the experiment unit. In some instances, the receiving of the specification of the experiment unit includes receiving a selection of an identifier of the experiment unit from one or more identifiers of one or more experiment units displayed in a user interface. The user interface may be used for specification of the details of the experiment. The selection may be received from a client device associated with an administrator of the experiment system. In certain instances, the receiving of the specification of the experiment unit includes receiving a reference to an identifier of the experiment unit and the value of the experiment unit from the client device (e.g., via a command-line user interface).

In some example embodiments, the experiment unit includes an online company page, and the value of the experiment unit includes an identifier (e.g., a Uniform Resource Locator (URL)) of a particular online company page hosted by the SNS. The experiment system may run an experiment that places the content of the particular company page differently in different variants of the experiment, and may determine which variant attracts more traffic (e.g., visitors) to the company page. Other example aspects of the company page that may vary are: the content of the page, additional information (e.g., links to pages of companies that are similar in some respect to the particular company), etc.

In various example embodiments, the experiment unit includes an email message, and the value of the experiment unit includes an identifier of a particular email message being transmitted to one or more users of the SNS. The experiment system may run an experiment that transmits different versions of an email message to the treatment group of users and the control group of users. Some example aspects of the email message that may be different between the treatment variant and the control variant are a title of the email message, a headline of the email message, a subject line of the email message, an image included in the email message, a call to action, etc.

In certain example embodiments, the experiment unit includes a job page, and the value of the experiment unit includes an identifier (e.g., a URL) of a particular job page hosted by the SNS. The experiment system may run an experiment that places the content of the particular job page differently in different variants of the experiment, and may determine which variant attracts more traffic (e.g., visitors) to the job page. Other example aspects of the job page that may vary are: the content of the page, additional information (e.g., links to other job pages that describe similar jobs), the amount of details about the job (e.g., one variant may have more details about the job, while another variant has fewer details about the job), etc.

The experiment system generates, for the value of the experiment unit, tracking data that tracks user interactions by one or more users of the SNS, via one or more browsers, with content provided during an execution of the experiment. For example, for the identifier of a particular online company page hosted by the SNS (e.g., Google), the experiment system generates tracking data that tracks user interactions by one or more users (e.g., members or guests) of the SNS, via one or more browsers, with content provided during an execution of the experiment. The user interactions may include clicking on certain elements of the company page, clicking on certain links, subscribing to follow the company, etc. According to another example, for the identifier of a particular email message being transmitted to one or more users of the SNS (e.g., email_message_1234), the experiment system generates tracking data that tracks user interactions by one or more users (e.g., members or guests) of the SNS, via one or more browsers, with content provided during an execution of the experiment. The user interactions may include clicking to open the email message, replying to the email message, selecting a link in the email message to unsubscribe from receiving email messages, etc. According to yet another example, for the identifier of a particular job page (e.g., job_page_XYZ) hosted by the SNS, the experiment system generates tracking data that tracks user interactions by one or more users (e.g., members or guests) of the SNS, via one or more browsers, with content provided during an execution of the experiment. The user interactions may include selecting a user interface element to apply for the particular job advertised on the particular job page, selecting a user interface element to request that similar jobs be communicated to the requester, etc.

In some example embodiments, the generating, for the value of the experiment unit, of the tracking data includes generating the tracking data for a plurality of values of the experiment unit. For example, the experiment system generates tracking data for a plurality of company pages, a plurality of job pages, a plurality of email messages, etc.

The experiment system generates, for the value of the experiment unit, metric data that measures an attribute associated with the experimental unit. In some example embodiments, the attribute associated with the experimental unit and measured by the metric data includes a number of unique visitors to the particular online company page. In various example embodiments, the attribute associated with the experimental unit and measured by the metric data includes a number of clicks by one or more users on the particular email message. In various example embodiments, the attribute associated with the experimental unit and measured by the metric data includes an application-for-the-job rate determined based on a number of views of the particular job page.

In some example embodiments, the generating of the metric data includes parsing the tracking data based on at least one of a type of variant of the experiment, the experiment unit, the value of the experiment unit, or a timestamp. The parsing results in parsed tracking data. The parsed tracking data may be used in generating experiment reports. The using of the parsed tracking data may result in faster generation of experiment reports.

The experiment system automatically generates an experiment report based on the tracking data and the metric data. In some example embodiments, the generating, by the experiment system, of the experiment report based on the tracking data and the metric data includes: determining, based on the metric data pertaining to a period of time, a value of the attribute that is associated with the experimental unit and that is measured by the metric data; and performing a join operation on the tracking data pertaining to the period of time and the metric data pertaining to the period of time based on the value of the experiment unit. The performing of the join operation results in joint tracking and metric data. The experiment report includes the joint tracking and metric data and the value of the attribute that is associated with the experimental unit and that is measured by the metric data.

The experiment system causes a presentation of the experiment report in a user interface of a client device.

The implementation of the experiment system has many benefits. The automatic performance of experiments based on flexible units for experimentation allows for customization of experiments, and for a significant scaling up of the amount of data that can be analyzed. The experiment system may automatically notify experiment system administrators about the results of the customized experiments without direct administrator involvement.

According to some example embodiments, one or more of the methodologies discussed herein may obviate a need for additional searching for information (e.g., tracking data searches, log file searches, metrics data searches, web searches, etc.), which may have the technical effect of reducing computing resources used by one or more devices within the experiment system, or within systems or databases associated with the experiment system. Examples of such computing resources include, without limitation, processor cycles, network traffic, memory usage, storage space, and power consumption.

Figure 1:
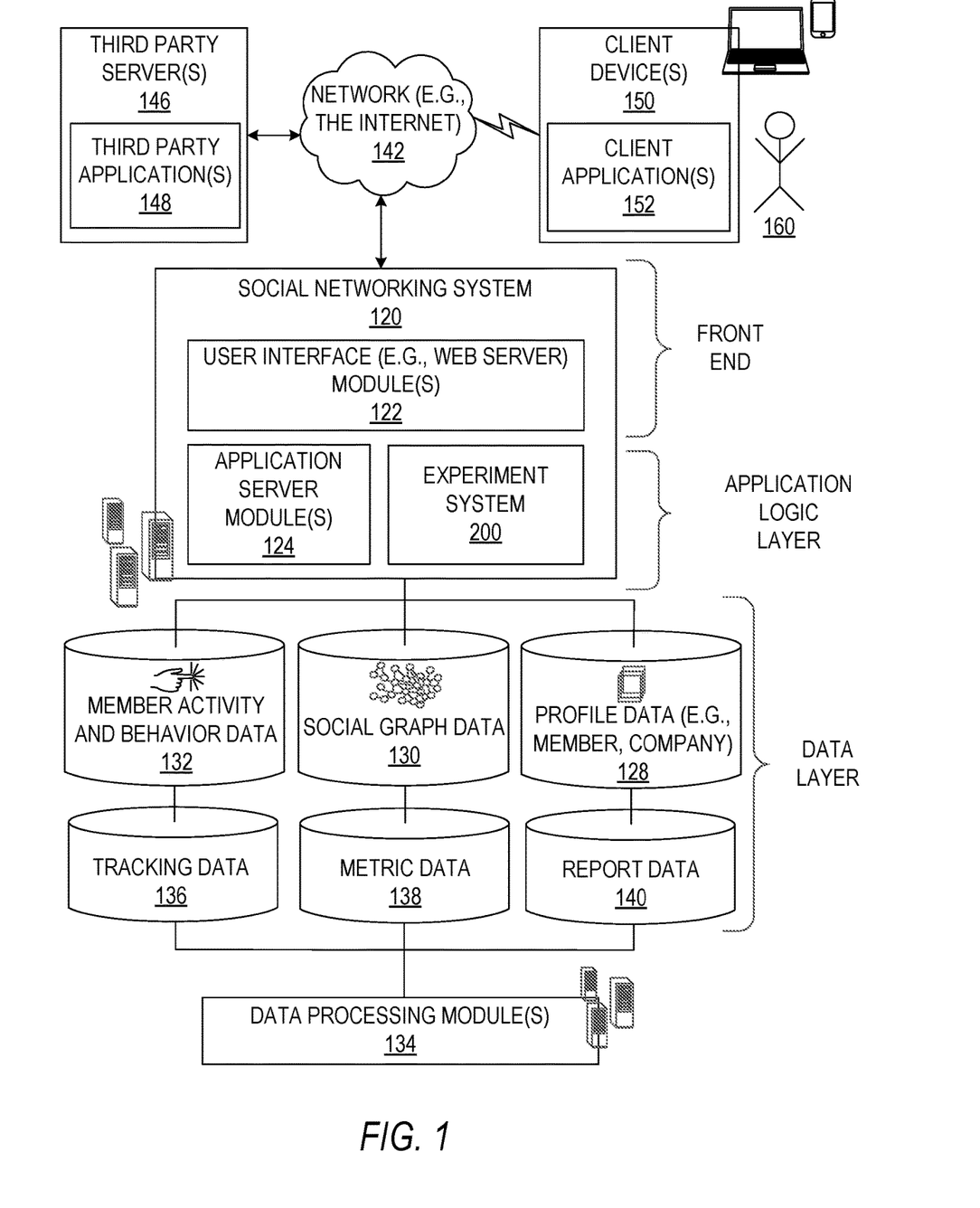
FIG. 1 is a network diagram illustrating a client-server system, according to some example embodiments.

An example method and system for performing A/B testing on customized experiment units may be implemented in the context of the client-server system illustrated in FIG. 1. As illustrated in FIG. 1, the experiment system 200 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 142 to exchange information with the social networking system 120. Each of the client devices 150 may comprise a computing device that includes at least a display and communication capabilities with the network 142 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online ad consumption event associated with the member (e.g., an online ad viewed by the member), the date and time when the online ad event took place, an identifier of the creative associated with the online ad consumption event, a campaign identifier of an ad campaign associated with the identifier of the creative, etc.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include the experiment system 200, which is described in more detail below.

Further, as shown in FIG. 1, a data processing module 134 may be used with a variety of applications, services, and features of the social networking system 120. The data processing module 134 may periodically access one or more of the databases 128, 130, 132, 136, 138, or 140, process (e.g., execute batch process jobs to analyze or mine) profile data, social graph data, member activity and behavior data, tracking data, metric data, or report data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
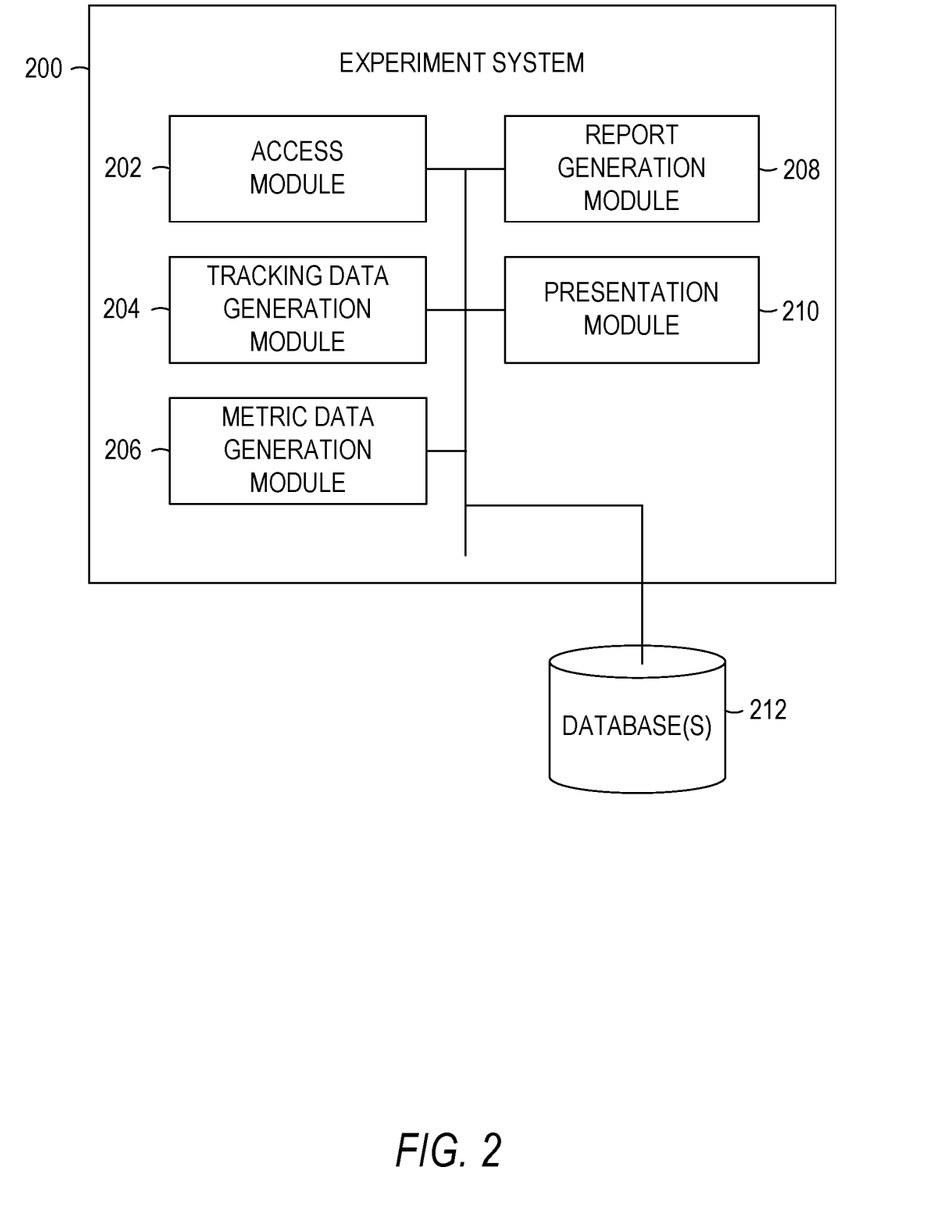
FIG. 2 is a block diagram illustrating components of an experiment system, according to some example embodiments.

FIG. 2 is a block diagram illustrating components of the experiment system 200, according to some example embodiments. As shown in FIG. 2, the experiment system 200 includes an access module 202, a tracking data generation module 204, a metric data generation module 206, a report generation module 208, and a presentation module 210, all configured to communicate with each other (e.g., via a bus, shared memory, or a switch).

According to some example embodiments, the access module 202 receives a specification of an experiment unit that identifies a type of subject of an experiment for execution on a social networking service (SNS). The access module 202 also receives a value of the experiment unit.

In some example embodiments, the receiving of the specification of the experiment unit includes receiving a selection of an identifier of the experiment unit from one or more identifiers of one or more experiment units displayed in a user interface. The user interface may be used for specification of the details of the experiment. The selection may be received from a client device associated with an administrator of the experiment system. In certain instances, the receiving of the specification of the experiment unit includes receiving a reference to an identifier of the experiment unit and the value of the experiment unit from the client device (e.g., via a command-line user interface).

In some example embodiments, the experiment unit includes an online company page, and the value of the experiment unit includes an identifier of a particular online company page hosted by the SNS. In various example embodiments, the experiment unit includes an email message, and the value of the experiment unit includes an identifier of a particular email message being transmitted to one or more users of the SNS. In certain example embodiments, the experiment unit includes a job page, and the value of the experiment unit includes an identifier of a particular job page hosted by the SNS.

The tracking data generation module 204 generates, for the value of the experiment unit, tracking data that tracks user interactions by one or more users of the SNS, via one or more browsers, with content provided during an execution of the experiment.

For example, the SNS hosts an online company page for Google. For the identifier of the Google company page hosted on the SNS, the experiment system generates tracking data that tracks user interactions by one or more users (e.g., members or guests) of the SNS, via one or more browsers, with content provided during an execution of the experiment that pertains to the Google company page hosted on the SNS. The user interactions may include clicking on certain elements of the company page, clicking on certain links, subscribing to follow the company, etc.

In some example embodiments, the generating, for the value of the experiment unit, of the tracking data includes generating the tracking data for a plurality of values of the experiment unit. For example, the experiment system generates tracking data for a plurality of company pages, a plurality of job pages, a plurality of email messages, etc.

The metric data generation module 206 generates, for the value of the experiment unit, metric data that measures an attribute associated with the experimental unit. In some example embodiments, the attribute includes a number of unique visitors to the particular online company page. In various example embodiments, the attribute includes a number of clicks by one or more users on the particular email message. In various example embodiments, the attribute includes an application-for-the-job rate determined based on a number of views of the particular job page.

In some example embodiments, the generating of the metric data includes parsing the tracking data based on at least one of a type of variant of the experiment, the experiment unit, the value of the experiment unit, or a timestamp. The parsing results in parsed tracking data. The parsed tracking data may be used in generating experiment reports. The using of the parsed tracking data may result in faster generation of experiment reports.

The report generation module 208 generates an experiment report based on the tracking data and the metric data. In some example embodiments, the generating, by the report generation module 208, of the experiment report includes determining, based on the metric data pertaining to a period of time, a value of the attribute that is associated with the experimental unit and that is measured by the metric data, and performing a join operation on the tracking data pertaining to the period of time and the metric data pertaining to the period of time based on the value of the experiment unit. The performing of the join operation results in joint tracking and metric data. The experiment report includes the joint tracking and metric data and the value of the attribute that is associated with the experimental unit and that is measured by the metric data.

The presentation module 210 causes a presentation of the experiment report in a user interface of a client device associated with an administrator of the experiment system 200. The causing of the presentation of the experiment report in the user interface, in some instances, is based on a request for the presentation of the experiment report, wherein the request is received from the client device of the administrator. In some instances, the causing of the presentation of the experiment report in the user interface is based on a schedule of automatic presentations of experiment reports in the user interface of the client device associated with the administrator.

To perform one or more of its functionalities, the experiment system 200 may communicate with one or more other systems. For example, an integration system may integrate the experiment system 200 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 212 (e.g., database 128, 130, 132, 136, 138, or 140).

Figure 3:
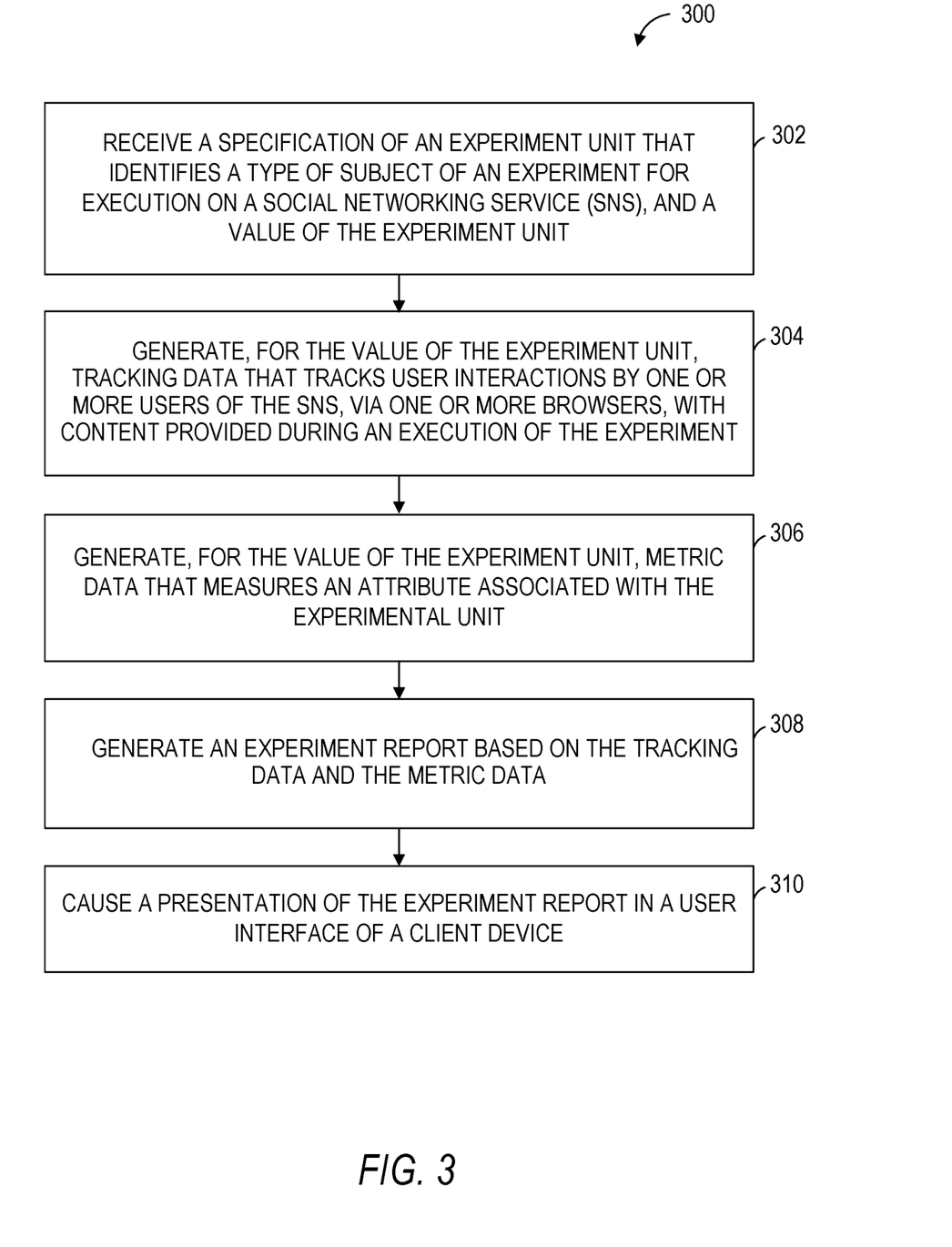
FIG. 3 is a flowchart illustrating a method for performing A/B testing on customized experiment units, according to some example embodiments.
Figure 4:
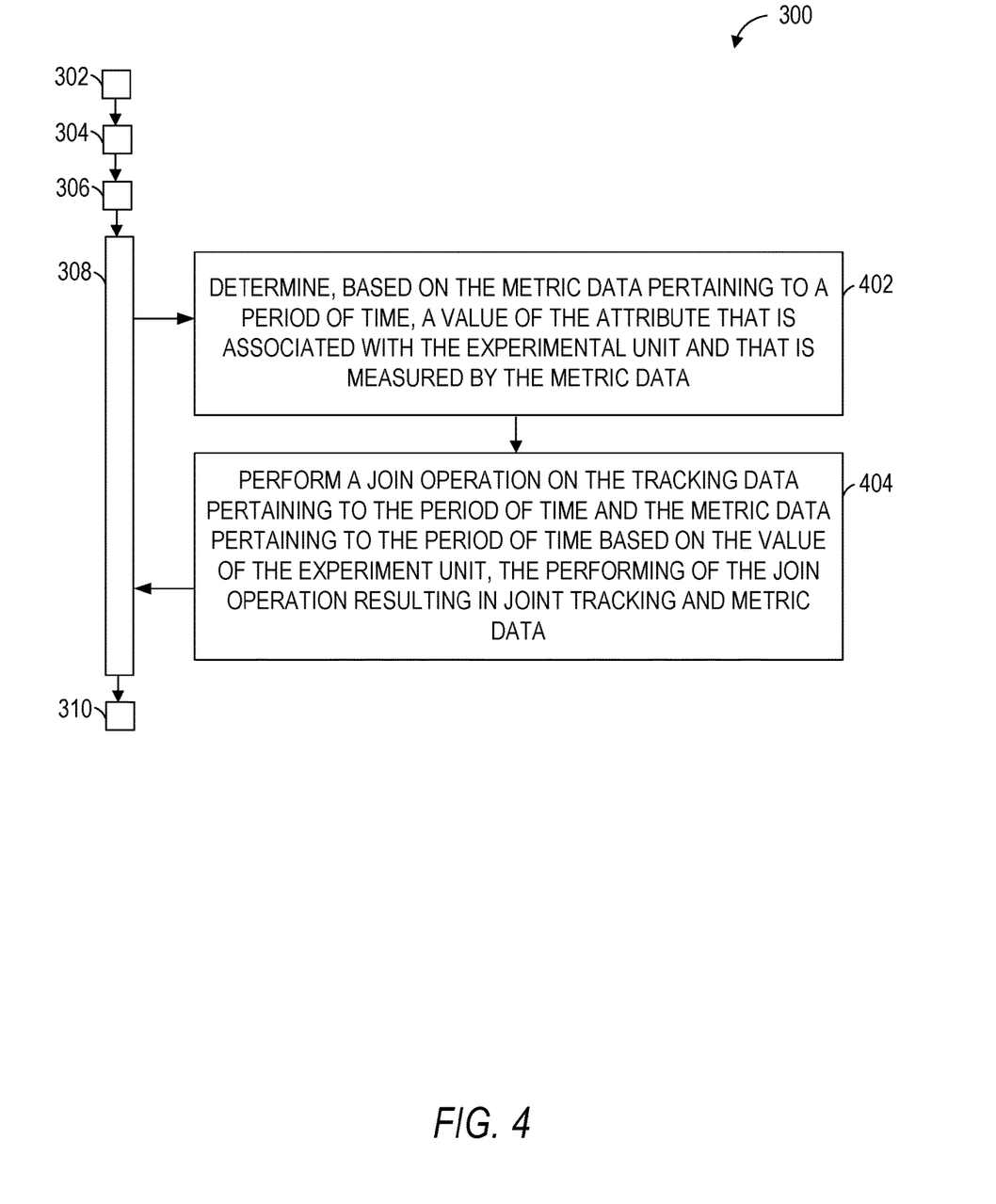
FIG. 4 is a flowchart illustrating a method for performing A/B testing on customized experiment units, and representing step 308 of the method illustrated in FIG. 3 in more detail, according to some example embodiments.

FIGS. 3 and 4 are flowcharts illustrating a method for performing A/B testing on customized experiment units, according to some example embodiments. Operations in the method 300 illustrated in FIG. 3 may be performed using modules described above with respect to FIG. 2. As shown in FIG. 3, method 300 may include one or more of method operations 302, 304, 306, 308, and 310, according to some example embodiments.

At operation 302, the access module 202 receives a specification of an experiment unit that identifies a type of subject of an experiment for execution on a social networking service (SNS), and a value of the experiment unit.

At operation 304, the tracking data generation module 204 generates, for the value of the experiment unit, tracking data that tracks user interactions by one or more users of the SNS, via one or more browsers, with content provided during an execution of the experiment.

At operation 306, the metric data generation module 206 generates, for the value of the experiment unit, metric data that measures an attribute associated with the experimental unit.

At operation 308, the report generation module 208 generates an experiment report based on the tracking data and the metric data.

At operation 310, the presentation module 210 causes a presentation of the experiment report in a user interface of a client device. Further details with respect to the method operations of the method 300 are described below with respect to FIG. 4.

As shown in FIG. 4, the method 300 may include one or more method operations 402 or 404, according to some example embodiments. Operation 402 may be performed as part (e.g., a precursor task, a subroutine, or a portion) of operation 308 of FIG. 3, in which the report generation module 208 generates an experiment report based on the tracking data and the metric data.

At operation 402, the report generation module 208 determines a value of the attribute that is associated with the experimental unit and that is measured by the metric data. The determining of the value of the attribute is based on the metric data pertaining to a period of time (e.g., the metric data determined for the period of time).

Operation 404 may be performed as part of operation 308 after operation 402. At operation 404, the report generation module 208 performs a join operation on the tracking data pertaining to the period of time and the metric data pertaining to the period of time. The performing of the join operation is based on the value of the experiment unit, wherein the value of the experiment unit appears both in the tracking data and the metric data. The performing of the join operation results in joint tracking and metric data. The experiment report includes the joint tracking and metric data, and the value of the attribute that is associated with the experimental unit and that is measured by the metric data.

Example Mobile Device

Figure 5:
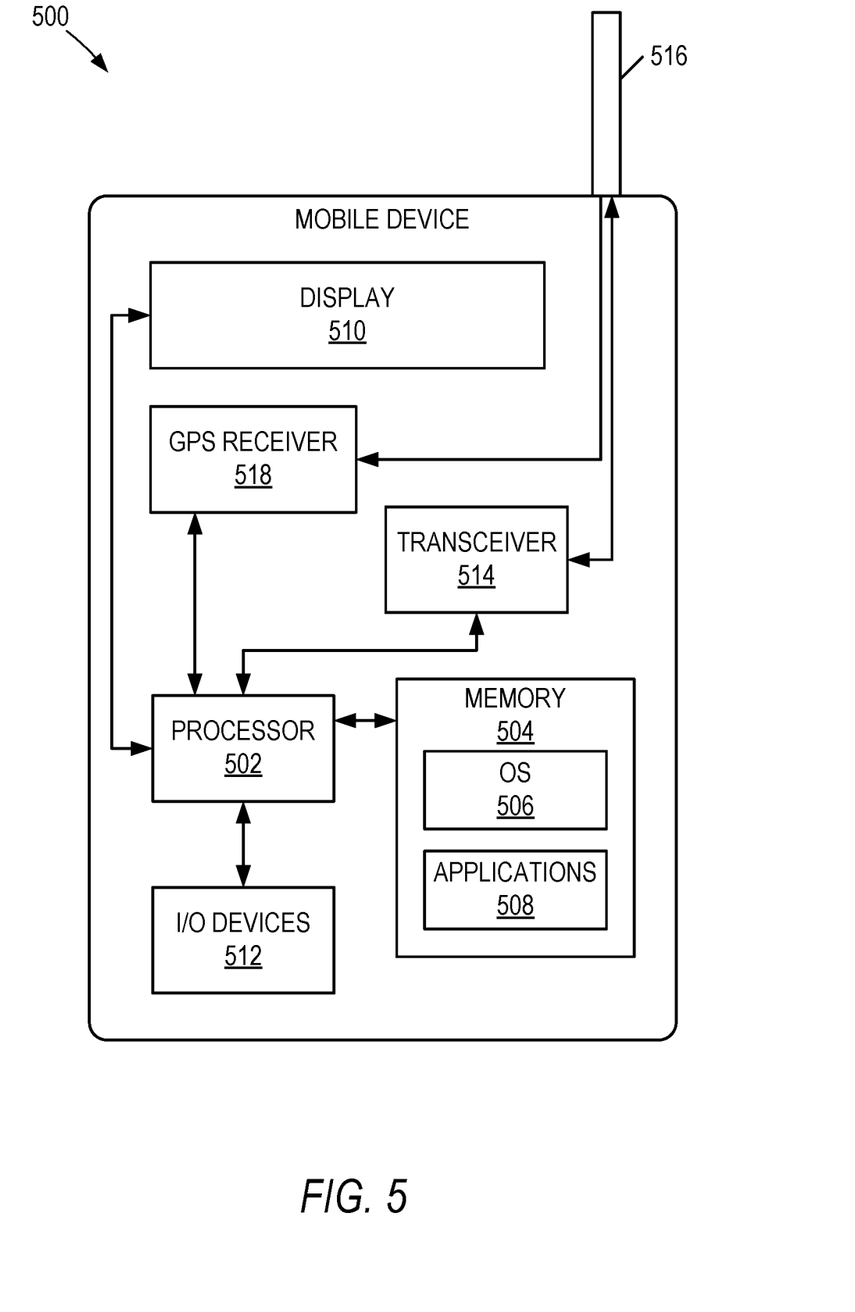
FIG. 5 is a block diagram illustrating a mobile device, according to some example embodiments.

FIG. 5 is a block diagram illustrating a mobile device 500, according to an example embodiment. The mobile device 500 may include a processor 502. The processor 502 may be any of a variety of different types of commercially available processors 502 suitable for mobile devices 500 (for example, an XScale architecture microprocessor, a microprocessor without interlocked pipeline stages (MIPS) architecture processor, or another type of processor 502). A memory 504, such as a random access memory (RAM), a flash memory, or other type of memory, is typically accessible to the processor 502. The memory 504 may be adapted to store an operating system (OS) 506, as well as application programs 508, such as a mobile location enabled application that may provide LBSs to a user. The processor 502 may be coupled, either directly or via appropriate intermediary hardware, to a display 510 and to one or more input/output (I/O) devices 512, such as a keypad, a touch panel sensor, a microphone, and the like. Similarly, in some embodiments, the processor 502 may be coupled to a transceiver 514 that interfaces with an antenna 516. The transceiver 514 may be configured to both transmit and receive cellular network signals, wireless data signals, or other types of signals via the antenna 516, depending on the nature of the mobile device 500. Further, in some configurations, a GPS receiver 518 may also make use of the antenna 516 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
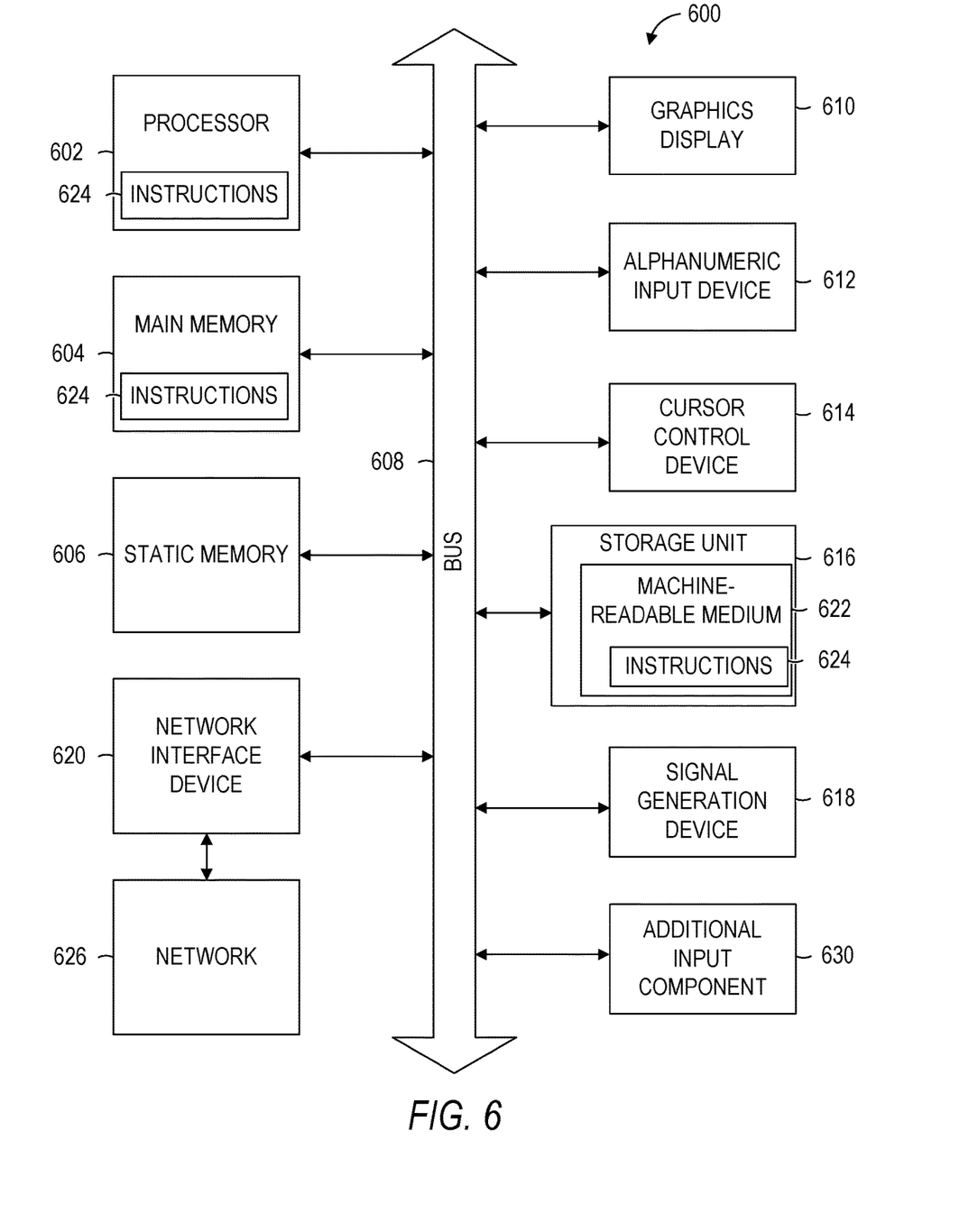
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, an audio generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media (e.g., tangible and non-transitory machine-readable media). The instructions 624 may be transmitted or received over the network 626 via the network interface device 620. For example, the network interface device 620 may communicate the instructions 624 using any one or more transfer protocols (e.g., hypertext transfer protocol (HTTP)).

In some example embodiments, the machine 600 may be a portable computing device, such as a smart phone or tablet computer, and have one or more additional input components 630 (e.g., sensors or gauges). Examples of such input components 630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data,"

"content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

receiving, from a client device, a selection of an identifier of an experiment unit from a plurality of identifiers of a plurality of experiment units displayed in a user interface for specification of an experiment for execution on a social networking service (SNS), and a value of the experiment unit, the plurality of experiment units including an online company page, an email message, and a job page, and the value of the experiment unit including an identifier of a particular online company page hosted by the SNS;

generating, for the value of the experiment unit, logging data that logs user interactions by one or more users of the SNS, via one or more browsers, with content provided during an execution of the experiment, the generating of the logging data being performed by one or more hardware processors;

generating, for the value of the experiment unit, metric data that measures an attribute associated with the experimental unit, the attribute associated with the experimental unit and measured by the metric data, including a number of unique visitors to the particular online company page;

generating an experiment report based on the logging data and the metric data; and causing a presentation of the experiment report in a user interface of the client device.

2. The method of claim 1, wherein the receiving of the specification of the experiment unit includes:

receiving a reference to an identifier of the experiment unit and the value of the experiment unit from the client device via a command-line user interface.

3. The method of claim 1, wherein the generating, for the value of the experiment unit, of the logging data includes:

generating the logging data for a plurality of values of the experiment unit.

4. The method of claim 1, wherein the generating of the metric data includes:

parsing the logging data based on at least one of a type of variant of the experiment, the experiment unit, the value of the experiment unit, or a timestamp, the parsing resulting in parsed logging data.

5. The method of claim 1, wherein the generating of the experiment report based on the logging data and the metric data includes:

determining, based on the metric data pertaining to a period of time, a value of the attribute that is associated with the experimental unit and that is measured by the metric data; and performing a join operation on the logging data pertaining to the period of time and the metric data pertaining to the period of time based on the value of the experiment unit, the performing of the join operation resulting in joint logging and metric data, wherein the experiment report includes the joint logging and metric data and the value of the attribute that is associated with the experimental unit and that is measured by the metric data.

6. A system comprising:

one or more hardware processors; and a machine-readable medium for storing instructions that, when executed by the one or more hardware processors, cause the one or more hardware processors to perform operations comprising:

receiving, from a client device, a selection of an identifier of an experiment unit from a plurality of identifiers of a plurality of experiment units displayed in a user interface for specification of an experiment for execution on a social networking service (SNS), and a value of the experiment unit, the plurality of experiment units including an online company page, an email message, and a job page, and the value of the experiment unit including an identifier of a particular online company page hosted by the SNS;

generating, for the value of the experiment unit, logging data that logs user interactions by one or more users of the SNS, via one or more browsers, with content provided during an execution of the experiment;

generating, for the value of the experiment unit, metric data that measures an attribute associated with the experimental unit, the attribute associated with the experimental unit and measured by the metric data, including a number of unique visitors to the particular online, company page;

generating an experiment report based on the logging data and the metric data; and causing a presentation of the experiment report in a user interface of the client device.

7. The system of claim 6, wherein the receiving of the specification of the experiment unit includes:

receiving a reference to an identifier of the experiment unit from the client device.

8. The system of claim 6, wherein the generating, for the value of the experiment unit, of the logging data includes:

generating the logging data for a plurality of values of the experiment unit.

9. The system of claim 6, wherein the generating of the metric data includes:

parsing the logging data based on at least one of a type of variant of the experiment, the experiment unit, the value of the experiment unit, or a timestamp, the parsing resulting in parsed logging data.

10. The system of claim 6, wherein the generating of the experiment report based on the logging data and the metric data includes:

determining, based on the metric data pertaining to a period of time, a value of the attribute that is associated with the experimental unit and that is measured by the metric data; and performing a join operation on the logging data pertaining to the period of time and the metric data pertaining to the period of time based on the value of the experiment unit, the performing of the join operation resulting in joint logging and metric data, wherein the experiment report includes the joint logging and metric data and the value of the attribute that is associated with the experimental unit and that is measured by the metric data.

11. A non-transitory machine-readable storage medium comprising instructions that, when executed by one or more hardware processors of a machine, cause the one or more hardware processors to perform operations comprising:

receiving, from a client device, a selection of an identifier of an experiment unit from a plurality of identifiers of a plurality of experiment units displayed in a user interface for specification of an experiment for execution on a social networking service (SNS), and a value of the experiment unit, the plurality of experiment units including an online company page, an email message, and a job page, and the value of the experiment unit including an identifier of a particular online company page hosted by the SNS;

generating, for the value of the experiment unit, logging data that logs user interactions by one or more users of the SNS, via one or more browsers, with content provided during an execution of the experiment;

generating, for the value of the experiment unit, metric data that measures an attribute associated with the experimental unit, the attribute associated with the experimental unit and measured by the metric data, including a number of unique visitors to the particular online company page;

generating an experiment report based on the logging data and the metric data; and causing a presentation of the experiment report in a user interface of the client device.

12. The non-transitory machine-readable storage medium of claim 11, wherein the generating of the experiment report based on the logging data and the metric data includes:

determining, based on the metric data pertaining to a period of time, a value of the attribute that is associated with the experimental unit and that is measured by the metric data; and performing a join operation on the logging data pertaining to the period of time and the metric data pertaining to the period of time based on the value of the experiment unit, the performing of the join operation resulting in joint logging and metric data, wherein the experiment report includes the joint logging and metric data and the value of the attribute that is associated with the experimental unit and that is measured by the metric data.

* * * * *

UNITED STATES PATENT AND TRADEMARK OFFICE
CERTIFICATE OF CORRECTION

PATENT NO. : 10,462,239 B1
APPLICATION NO. : 15/223865
DATED : October 29, 2019
INVENTOR(S) : Xu et al.

Page 1 of 1

It is certified that error appears in the above-identified patent and that said Letters Patent is hereby corrected as shown below:

In the Claims

In Column 18, Line 39, in Claim 6, delete "online," and insert --online-- therefor Signed and Sealed this
Seventh Day of April, 2020

Andrei Iancu
*Director of the United States Patent and Trademark Office*